UNITED STATES PATENT OFFICE 2,321,764

ARTICLE OF MANUFACTURE

James A. Mitchell, Kenmore, N. Y., assignor to E. I. du Pont de Nemours & Company, Wilmington, Del., a corporation of Delaware No Drawing. Application December 6, 1941,
Serial No. 421,963

3 Claims. (Cl. 260—734)

This invention relates to moisture-resistant sheet wrapping material, especially moisture-proofed transparent non-fibrous sheet. More particularly it appertains to age-resistant heat sealable moistureproofing coatings on films of regenerated cellulose and the like.

One of the newer sheet wrapping materials consists of a thin cellulosic base sheet having a moistureproofing coating. The manufacture of typical base sheet (film, foil, pellicle, skin, tissue, web) which usually contains softening material, for example, glycerol, is described in U. S. A. Patents 1,548,864 (Brandenberger) and 2,123,883 (Ellsworth). Representative coating compositions and the application thereof, are set out in U. S. A. Patents 1,737,187 (Charch & Prindle), 1,826,697-8 (Charch & Craigue), 2,042,589 (Charch & Hershberger), 2,147,180 (Ubben), 2,159,151 (Hershberger), 2,169,366 (Meigs) and 2,201,747 (Staudt).

The coating is usually a continuous, unbroken layer comprising essentially moistureproofing material (material which does not dissolve more than an infinitesimal amount of, if any water), for example, a waxy (wax-like) substance such as paraffin wax, and a cementing (binding, film-forming) material therefor, for example, cellulose nitrate.

To improve the properties of the coating, inter alia, flexibility, plasticizing material, for example dibutyl phthalate, is generally incorporated therein.

To overcome any haziness which might result from some proportions and combinations of other components of the coating, transparentizing (blending, homogenizing) material, for example, resins and gums such as Damar and ester gum, is ordinarily included.

In spite of the many desirable properties of this kind of wrapping material, it has certain characteristics which limit its usefulness. One of the commonest and simplest methods for sealing packages (so that the contents are completely enclosed) is by means of heat and pressure. Moistureproofed transparent regenerated cellulose film possesses to a certain degree the characteristic of being sealable by this method, but it does not possess this property to an extent which is completely satisfactory. Extensive research has been and is being carried out with the object of improving this type of material, particularly with respect to the characteristic just mentioned.

It has been proposed that cyclized rubber be employed as the cementing agent in this type of coating in order to produce better heat seals. The seals are initially very good, but they weaken rapidly, indicating that this material suffers some deleterious (molecular) change with age. Deterioration of the heat seal is so great that products embodying the same are not generally commercially acceptable. In addition, the cyclized rubber discolors rapidly, particularly when subjected to sunlight and/or heat, and this militates against its presence in wrappers for food-stuffs because discoloration of the wrapper suggests that the food-stuffs are not in the best of condition and the salability of the package is therefore very greatly decreased. These drawbacks, inter alia, have retarded the development of moistureproofing coatings containing cyclized rubbers.

The aforementioned cyclized rubber is a resin-like material obtained when a very high grade of low protein content rubber is made into a heavy viscous non-drying cement with benzene, and refluxed with a catalyst such as stannic chloride (U. S. A. Patent No. 2,050,209 to Gehman; also U. S. A. Patents 1,797,188, 1,846,247, 1,853,334 and 2,052,931). It appears to have the formula:

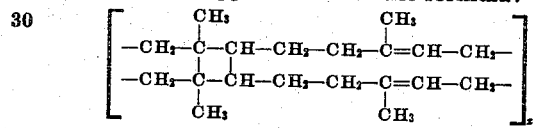

$x$ being a large whole number somewhat smaller than the number of isoprene units in rubber. Minor variations in certain properties (distortion point, solution viscosity) of the cyclized rubber, obtained by varying the time of reaction (conversion), result in a family of resins offered in commerce under the trade names Pliolite, Plioform, Marbon, etc.

It has now been found that color formation in moistureproofing coatings employing cyclized rubber as the cementing agent, can be restrained (avoided, prevented, inhibited, curbed, repressed, obviated) and the products embodying the same stabilized and their life very greatly lengthened, by incorporating therein (compounding with, diluting with) diamino diphenyl methane and its low alkyl (less than 3 carbon atoms) amino substitution derivatives. These additive compounds are comprehended by the general structural formula:

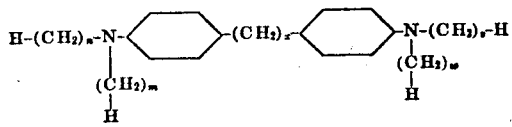

in which $n$, $m$, $v$, $w$ and $x$ are numerals from the group consisting of 0, 1 and 2.

The primary object of this invention was to provide improved moistureproofing coatings. Other objects were to improve heat sealable moistureproofing coatings, to lengthen the life of heat sealable coatings containing cyclized rubber, to stabilize cyclized rubber against deterioration from age, to prevent the formation of color in moistureproofing coatings and the like containing cyclized rubber, and to devise heat sealing processes which would give seals having a long life. A general advance in the art, and other objects which will appear hereinafter, are also contemplated.

How the foregoing objects and related ends are accomplished will be apparent from the following exposition, in which are disclosed the principle and divers embodiments of the invention, including the best mode contemplated for carrying out the same. Parts are given by weight throughout the application unless otherwise specified.

Comparative heat seal strengths appear to be the most satisfactory way of showing the effectiveness (stabilizing effect) of the diamino diphenyl methanes. A standard heat seal strength test (U. S. A. Patent No. 2,147,180 to Ubben) was used to secure the data in the tables of representative results which follow. In this test two strips of the coated material (in this case regenerated cellulose sheeting) 1.5 inches wide are superimposed one on the other so that opposite faces of the material are in contact. A seal is made across the width of the material at one end by placing the material on a metal plate heated to 130° C., and rolling thereover a roller ⅝ inch wide weighted to 650 grams. The two strips so sealed are opened at the free end and positioned in a stretching device such as a Suter testing machine with suitable clamps gripping each of the free ends of the sheet, one of which clamps being fixed, while the other is moved away at a constant speed of 12 inches per minute. The force in grams required to pull the sheets apart is taken as a measure of the heat seal bond strength.

Moistureproofing coating compositions comprising 12% solids dispersion in toluene were prepared from 10 parts of paraffin wax (M. P. 60° C.), 90 parts of milled Pliolite[1] having a softening point of 30° C., and 2 parts of the various diamino diphenyl methanes. The diamino diphenyl methanes employed in the series of tests listed in Table 1 were as follows:

(a) 4:4'-diamino diphenyl methane
(b) N:N:N':N'-tetramethyl-4:4'-diamino diphenyl methane
(c) N:N:N':N'-tetraethyl-4:4'-diamino diphenyl methane
(d) N:N'-dimethyl-N:N'-diethyl-4:4'-diamino diphenyl methane
(e) 4:4'-diamino diphenyl

[1] A cyclized rubber made by condensing rubber with a catalyst of the tin tetrachloride type. Specific details of its preparation, structure, etc., are set forth in the Paper Trade Journal, page 96, February 23, 1939, Rubber Age, April 1939, and J. I. E. C. XIX 1033, XXVI 125 and XXXIII 389.

Heat seal data on these moistureproofing coatings applied to regenerated cellulose film are given in the table. The aging was carried out at 95° F. (35° C.).

Table 1

| Addition compound | Original 0 days | 7 days | 14 days | 21 days | 28 days | 35 days | 42 days |
|---|---|---|---|---|---|---|---|
| Blank | 250 | 75 | 10 | 0 | 0 | 0 | 0 |
| (a) | 250 | 230 | 150 | 150 | 150 | 150 | 150 |
| (b) | 250 | 200 | 190 | 150 | 135 | 130 | 120 |
| (c) | 250 | 250 | 225 | 160 | 150 | 150 | 150 |
| (d) | 250 | 190 | 180 | 140 | 130 | 130 | 130 |
| (e)[1] | 300 | [2]250 | 180 | 155 | 140 | | |

[1] In this composition there were 3 parts of the addition compound instead of 2.
[2] At the end of 6 days.

*Example I*

Prepare a moistureproofing lacquer by dissolving a mixture of 90 parts of Pliolite (milled material softening at 30° C.), 10 parts paraffin wax (M. P. 60° C.) and 2 parts of N:N:N':N'-tetraethyl-4:4'-diamino diphenyl methane in sufficient toluene to give a 12% solids dispersion. Pass a sheet of regenerated cellulose approximately 0.00088 of an inch thick through this lacquer. Remove the excess solution from the surface by means of doctor knives and introduce the coated sheet into a drier through which air is circulating. Raise the temperature rapidly and dry the coating at a temperature approximately equal to the melting point of the wax. The material so produced is highly transparent, flexible, moistureproof and heat sealable, and exhibits no degradation of moistureproofness or heat seal after a period of one week from the time of coating.

*Example II*

Apply a moistureproofing coating consisting of:

| | Parts |
|---|---|
| Pliolite (softening point 30° C.) | 90 |
| Paraffin wax (M. P. 60° C.) | 10 |
| N:N:N':N'-tetramethyl-4:4'diamino diphenyl methane | 2 | to a regenerated cellulose sheet in the manner described in Example I. The product so produced is highly transparent, moistureproof, and exhibits good heat seal.

*Example III*

Apply a moistureproofing coating consisting of:

| | Parts |
|---|---|
| Pliolite (softening point 30° C.) | 90 |
| Paraffin wax (M. P. 60° C.) | 10 |
| 4:4'-diamino diphenyl methane | 2 | to a regenerated cellulose sheet in the manner described in Example I. The product so produced is highly transparent, moistureproof, and exhibits good heat seal.

*Example IV*

Apply a moistureproofing coating consisting of:

| | Parts |
|---|---|
| Pliolite (softening point 30° C.) | 90 |
| Paraffin wax (M. P. 60° C.) | 10 |
| N:N' - dimethyl - N:N' - diethyl - 4:4'- diamino diphenyl methane | 2 | to a regenerated cellulose sheet in the manner described in Example I. The product so produced is highly transparent, moistureproof, and exhibits good heat seal.

Example V

Apply a moistureproofing coating consisting of:

| | Parts |
|---|---|
| Pliolite (softening point 30° C.) | 90 |
| Paraffin wax (M. P. 60° C.) | 10 |
| 4:4'-diamino diphenyl | 2 | to a regenerated cellulose sheet in the manner described in Example I. The product so produced is highly transparent, moistureproof, and exhibits good heat seal.

Example VI

Apply a moistureproofing coating consisting of:

| | Parts |
|---|---|
| Pliolite (softening point 30° C.) | 90 |
| Paraffin wax (M. P. 60° C.) | 10 |
| N:N:N':N' - tetramethyl - 4:4' - diamino diphenyl methane | 3 | to a regenerated cellulose sheet in the manner described in Example I. The product so produced is highly transparent, moistureproof, and exhibits good heat seal.

Example VII

Apply a moistureproofing coating consisting of:

| | Parts |
|---|---|
| Pliolite (softening point 30° C.) | 90 |
| Paraffin wax (M. P. 60° C.) | 10 |
| N:N:N':N' - tetraethyl - 4:4' - diamino diphenyl methane | 3 | to a regenerated cellulose sheet in the manner described in Example I. The product so produced is highly transparent, moistureproof, and exhibits good heat seal.

Example VIII

Apply a moistureproofing coating consisting of:

| | Parts |
|---|---|
| Pliolite (softening point 30° C.) | 90 |
| Paraffin wax (M. P. 60° C.) | 10 |
| Di(p-ethoxyphenylamino)ethane | 2 | to a sheet of regenerated cellulose in the manner described in Example I. The product produced in this manner is highly transparent, moistureproof, and exhibits good heat seal.

Example IX

Apply a moistureproofing coating consisting of:

| | Parts |
|---|---|
| Pliolite (softening point 30° C.) | 90 |
| Paraffin wax (M. P. 60° C.) | 10 |
| Tetramethyl-diamino-benzhydrol | 2 | to a sheet of regenerated cellulose in the manner described in Example I. The product produced in this manner is highly transparent, moistureproof, and exhibits good heat seal.

Example X

Apply a moistureproofing coating consisting of:

| | Parts |
|---|---|
| Pliolite (softening point 30° C.) | 90 |
| Paraffin wax (M. P. 60° C.) | 10 |
| 4:4'-diamino-benzophenone | 3 | to a sheet of regenerated cellulose in the manner described in Example I. The resultant product is highly transparent, moistureproof, and exhibits good heat seal.

Example XI

Apply a moistureproofing coating consisting of:

| | Parts |
|---|---|
| Pliolite (softening point 30° C.) | 90 |
| Paraffin wax (M. P. 60° C.) | 10 |
| 2:4-diamino-diphenyl-amine | 3 | to a sheet of regenerated cellulose in the manner described in Example I. The resultant product is highly transparent, moistureproof, and exhibits good heat seal.

Example XII

Apply a moistureproofing coating consisting of:

| | Parts |
|---|---|
| Pliolite (softening point 30° C.) | 90 |
| Paraffin wax (M. P. 60° C.) | 10 |
| 4:4'-diamino-diphenyl ether | 3 | to a sheet of regenerated cellulose in the manner described in Example I. The resultant product is highly transparent, moistureproof, and exhibits good heat seal.

Example XIII

Apply a moistureproofing coating consisting of:

| | Parts |
|---|---|
| Marbon B[1] | 90 |
| Paraffin wax (M. P. 60° C.) | 10 |
| N:N:N':N' - tetraethyl - 4:4' - diamino diphenyl methane | 3 | to a regenerated cellulose sheet in the manner described in Example I. The product so produced is highly transparent, moistureproof, and exhibits good heat seal.

Example XIV

Apply a moistureproofing coating consisting of:

| | Parts |
|---|---|
| Marbon B | 90 |
| Paraffin wax (M. P. 60° C.) | 10 |
| N:N:N':N' - tetramethyl - 4:4' - diamino diphenyl methane | 2 | to a regenerated cellulose sheet in the manner described in Example I. The product so produced is highly transparent, moistureproof, and exhibits good heat seal.

Preferably the addition materials are from the group consisting of N:N:N':N'-tetraethyl-4:4'-diamino - diphenyl - methane, N:N:N':N' - tetramethyl - 4:4' - diamino-diphenyl-methane, N:N'-dimethyl-N:N' - diethyl-4:4'- diamino-diphenyl-methane, 4:4'-diamino-diphenyl-methane, 4:4'-diamino-diphenyl, di(p-ethoxyphenylamino)ethane, tetra - methyl - diamino - benzhydrol, 4:4'-diamino - benzophenone, 2:4 - diamino-diphenyl-amine, 4:4'-diamino-diphenyl ether, 4:4'-diamino-diphenyl-ethane, N:N:N':N'-tetramethyl-4:4' - diamino - diphenyl - ethane, 3:3' - diamino-benzophenone, N:N:N':N' - tetraethyl - 4:4' - diamino-diphenyl-ethane, N:N:N':N'-tetramethyl-4:4' - diamino - diphenyl, tetra-methyl-diamino-benzophenone, tetraethyl - diamino - benzo - phenone, N:N:N':N' - tetraethyl-4:4' - diamino - diphenyl, N:N' - dimethyl-N:N' - diethyl-4:4'-diamino-diphenyl, tetramethyl benzidine, 4:4'-tetramethyl-diamino-triphenyl-methane, N:N'-dimethyl - N:N' - diethyl-4:4'-diamino-diphenyl-ethane, N:N - dimethyl-4:4' - diamino - diphenyl, N:N - dimethyl-4:4'-diamino-diphenyl-methane,

---

[1] Practically pure cyclized rubber containing no chlorine or other impurity except those normally present in rubber, and having a softening point of 50° C.

4:4'-diamino-diphenyl-amine, N:N-diethyl-4:4'-diamino-diphenyl-methane, N:N'-tetramethyl-4:4'-diamino-diphenyl-amine, and N:N-tetramethyl-4:4'-diamino-diphenyl ether.

The cyclized rubber may be prepared in any one of several different ways, and its composition and properties may vary somewhat, but however prepared, it is thermoplastic and less unsaturated than rubber. It appears to have an empirical formula $(C_5H_8)_x$ and to be a condensation derivative of rubber. The term "condensation" is used in the same sense that it is employed by Cohen (page 245 of his "Organic Chemistry for Advanced Students," 1909 edition, namely:

"Condensation may, then, be defined as the union of two or more organic molecules or parts of the same molecule with or without elimination of component elements, in which the new combination is effected between carbon atoms."

In the condensation, various reagents may be employed for converting rubber into the rubber derivative. In one mode of preparation, a solution (the reaction with the rubber is advantageously carried out in solution) of the rubber in benzene is boiled for an hour or two and then, while continuing the boiling under reflux condenser, up to 10% (based on the amount of rubber) of a conversion agent such as stannic chloride, is added. The heating is then continued for perhaps several hours, until the desired reaction has taken place. The condensation derivative of the rubber is isolated by pouring the reaction mass into water, acetone, alcohol (methyl, ethyl, etc.) and the like.

Tin tetrachloride apparently reacts with the rubber to form a tin chloride addition product of rubber (or cyclized rubber) which probably has the formula $(C_5H_8)_x \cdot SnCl_4$. The tin and chlorine split off upon drowning the reaction product, leaving the cyclized rubber hydrocarbon. In this procedure aluminum chloride, ferric chloride, chromic chloride or another halide of an amphoteric metal, may replace the tin chloride.

Condensation derivatives containing a small amount of combined chlorine are obtained when a rubber cement is treated with chlorostannic acid or a mixture of hydrochloric acid and a compound such as tin tetrachloride. It is not necessary to preboil the cement before treatment if the rubber conversion agent employed is of this sort. In this type of reaction, rubber, milled to a plasticity of about 300, is dissolved in sufficient benzene to form a 10% solution, and to the resultant 10% (based on the weight of the rubber) of crystalline chlorostannic acid is added. The reaction mixture is then heated to boiling under a reflux condenser maintained at or near the boiling point until the desired reaction has taken place.

To isolate the cyclized rubber, the reaction mixture is filtered and poured with agitation into sufficient water to form an emulsion in which the solution of the reaction product forms the discontinuous phase. It is advantageous to add a reducing agent such as sodium sulfite to the water to prevent or minimize the oxidation. The emulsion is steam distilled to remove the benzene, with the result that the condensation derivative precipitates as a fine powder.

The deformation point (the point at which plastic flow is detectable) of the condensation derivative depends (apparently) upon the time and temperature of the treatment. The reaction at the beginning is highly exothermic, and the practical lower deformation point (sometimes called "softening point" is about 30° C. A deformation point of about 105° C. is substantially the highest obtainable.

Products having the lower deformation points are usually obtainable commercially in the non-homogeneous form which results from drowning the reaction mixture and in the uniform condition obtained by milling the non-uniform product. The milled products are generally the more stable of the two and are more uniformly soluble. The distinction between the two types of materials progressively disappears as the deformation point is raised. It is advantageous to mill the powder to a homogeneous mass before compounding it with the other ingredients in the present invention, but the unmilled product can be used.

Condensation derivatives (cyclized rubber) with a softening point near the lower end of the range 30° to 105° C., are in general preferred. A product with a softening point around 30° C. is ordinarily employed. Obviously, the most satisfactory softening point depends upon the particular use to which the material is to be put. Although the 30° C. softening material was employed in many of the specific examples, it is to be understood that any one or a plurality of the products may be employed, when desired.

As the moistureproofing agent, any wax (used generically to include waxy or wax-like substances like paraffin wax, as well as true waxes which are monohydric alcohol esters of higher fatty acids) or mixture of waxes, may be employed. Ordinarily paraffin wax melting above 50° C., or better, that melting at 60° C. (and above), is preferred.

The new cementing agent compositions are especially useful in coating compositions applied to transparent, smooth, substantially non-porous, non-fibrous sheet, such as those composed of cellulosic material, for example, regenerated cellulose and cellulose acetate, albuminous material, for example, gelatin and casein, and polyvinyl compounds, for example, polyvinyl alcohols and polyvinyl acetals. Water sensitive sheet obtained by coagulation or precipitation and/or regeneration from aqueous (or aqueous alkaline, for example, alkali metal hydroxide and the like) dispersions (or solutions), for example, viscose, cuprammonium and like regenerated cellulose, polyvinyl alcohol, low (lowly) substituted (less than one mol per glucose unit) cellulose ethers (U. S. A. Patent No. 2,123,880 to Ellsworth), such as glycol cellulose, cellulose glycolic acid, alkyl (methyl, ethyl, etc.) cellulose, and the like, are especially satisfactorily coated with the moistureproofing compositions of this invention. As indicated above, the presence of the new cyclized rubber compositions also improves coating compositions used on organic solvent soluble compounds like cellulose ethers, for example, ethyl cellulose, and cellulose esters, for example, cellulose acetate. The same is true with paper, modified paper, lowly esterfied cellulose, etc. The new compounds can also be used to coat fabrics, to prepare molding materials, to act as cementing (binding) agents in protective coatings for wood, metal, etc., as adhesives, and for numerous other purposes. These compositions also serve admirably as adhesives in the lamination of sheet material, for example, regenerated cellulose, cellulose derivatives of the same or different kinds, regenerated cellulose to paper, etc., especially when a moistureproof product is desired.

Ordinary moistureproof sheet wrapping material consists of a regenerated cellulose film 0.00088 of an inch thick, with a moistureproofing coating 0.0005 of an inch thick on each side.

The diamino diphenyl methanes may be introduced into the cyclized rubber or compositions containing the same, in any desired manner. Ordinarily the incorporation is made by the use of a mutual solvent or by milling, but grinding, kneading, and other conventional mixing procedures are satisfactory.

The stabilizing effect of the diamino diphenyl methane is roughly proportional to the amount used with the cyclized rubber. The practical limits are from 0.005 to 0.5 per part of cyclized rubber. Improvement obtained by using amounts below the aforementioned lower limit is detectable but not great enough to be of practical value, and no advantage seems to be afforded by using proportions greater than the aforementioned upper limit.

In the preferred procedures, moistureproofing coatings are applied by passing the base sheet through a bath (solution) containing the coating composition or by spraying a corresponding solution on the base sheet.

The properties of the new cyclized rubber compositions may be enhanced and modified in known ways, by the incorporation of minor proportions of other materials. Details of the conventional modifying practices such as dyeing, pigmenting, plasticizing (or softening), transparentizing, and like procedures and materials used therein, are well known and are disclosed in the patents listed elsewhere herein. Reference is made thereto for specific details. Beneficial results are frequently brought about by incorporating natural and/or synthetic resins.

Moistureproofness, moistureproofing and moistureproof materials and expressions are defined in U. S. A. Patent No. 2,147,180 (Ubben). In the interest of brevity the definitions are not repeated here. The terms and expressions related thereto and employed herein are used in accordance with such definitions.

Heat seal bond and heat seal bond strength are defined and a standard test for their determination is given in U. S. A. Patent No. 2,147,180 (Ubben). In the interest of brevity the definitions and test description are not repeated here. The terms and expressions related thereto and employed herein are used in accordance with such definitions and description.

Many of the advantages of the present invention are believed apparent from the foregoing part of the specification. The cyclized rubber is stabilized for long periods of time, if not indefinitely, and as a result the compositions containing the same have their useful life extended many times over, even under conditions involving high temperatures and/or strong light.

The cyclized rubber diamino diphenyl methane cementing agents make it possible to produce moistureproof products which retain their desirable properties (heat seal, etc.) over an unexpectedly long period of time.

As many apparently widely different embodiments of this invention may be made without departing from the spirit and scope thereof, it is to be understood that this invention is not limited to the specific embodiments thereof except as defined in the appended claims.

I claim:

1. Moistureproofing coating composition comprising essentially a 12% solution in toluene of 10 parts wax, 90 parts cyclized rubber and 2 parts tetraethyl diamino diphenyl methane, said cyclized rubber having been prepared by heating rubber with an amphoteric metal halide.

2. Moistureproof sheet wrapping material consisting of regenerated cellulose sheet having a moistureproofing coating comprising essentially 10 parts paraffin wax, 90 parts milled cyclized rubber having a deformation point of 30° C., and 2 parts tetra-ethyl diamino diphenyl methane, said cyclized rubber having been prepared by heating rubber with an amphoteric metal halide.

3. A moistureproofing lacquer comprising essentially 12% solids and an organic solvent therefor, said solids comprising essentially 10 parts wax, 90 parts cyclized rubber and 2 parts tetraethyl diamino diphenyl methane, said cyclized rubber having been prepared by heating rubber with an amphoteric metal halide.

JAMES A. MITCHELL.